United States Patent
Pudleiner et al.

(10) Patent No.: US 7,662,471 B2
(45) Date of Patent: Feb. 16, 2010

(54) LIGHT-SCATTERING FILMS AND THE USE THEREOF IN FLAT SCREENS

(75) Inventors: Heinz Pudleiner, Krefeld (DE); Klaus Meyer, Dormagen (DE); Jörg Nickel, Dormagen (DE)

(73) Assignee: Bayer MaterialScience AG, Leverkusen (DE)

( * ) Notice: Subject to any disclaimer, the term of this patent is extended or adjusted under 35 U.S.C. 154(b) by 169 days.

(21) Appl. No.: 11/581,497

(22) Filed: Oct. 16, 2006

(65) Prior Publication Data

US 2007/0088126 A1      Apr. 19, 2007

(30) Foreign Application Priority Data

Oct. 19, 2005   (DE) .................. 10 2005 050 072

(51) Int. Cl.
*B32B 9/00*      (2006.01)
*B32B 33/00*   (2006.01)

(52) U.S. Cl. .................. 428/323; 428/327; 428/332; 428/339; 428/409

(58) Field of Classification Search .................. 428/332, 428/339, 409, 323, 327
See application file for complete search history.

(56) References Cited

U.S. PATENT DOCUMENTS

| 5,237,004 | A | | 8/1993 | Wu et al. ...................... 525/85 |
| 5,346,954 | A | | 9/1994 | Wu et al. ...................... 525/85 |
| 5,944,405 | A | * | 8/1999 | Takeuchi et al. ............. 362/617 |
| 2002/0025413 | A1 | * | 2/2002 | Ohbayashi et al. .......... 428/195 |
| 2004/0066645 | A1 | | 4/2004 | Graf et al. ..................... 362/31 |
| 2006/0209526 | A1 | * | 9/2006 | Miyauchi ..................... 362/29 |

FOREIGN PATENT DOCUMENTS

| EP | 634 445 B1 | 8/1999 |
| JP | 7-90167 | 4/1995 |
| WO | 2004/090587 A1 | 10/2004 |

* cited by examiner

*Primary Examiner*—Jeffrey C Mullis
(74) *Attorney, Agent, or Firm*—Connolly Bove Lodge & Hutz LLP

(57) ABSTRACT

A film comprising a matrix of transparent polymeric resin, and polymeric particles is disclosed. The particles are characterized in that their refractive index is different from that of the polymeric resin and in that their average particle size is 1 and 100 μm. One surface of the film is structured its 60° gloss value is greater than 0.5 and smaller than 20%, and its roughness is greater than 3 and lower than 25 μm. The other surface has a 60° gloss value greater than 50%. The film is suitable for use in flat screens.

8 Claims, No Drawings

LIGHT-SCATTERING FILMS AND THE USE THEREOF IN FLAT SCREENS

FIELD OF THE INVENTION

The present invention relates to polymeric films and in particular to diffuser films

TECHNICAL BACKGROUND OF THE INVENTION

Light-scattering translucent products of transparent plastics with various light-scattering additives and mouldings produced therefrom are known.

US 2004/0066645 A1 describes in general light-scattering materials which comprise 0.2 to 5% of light-scattering particles and which have a light transmission of greater than 70% and a haze of at least 10%.

The scattering additive has an average diameter of from 3 to 10 µm.

JP 07-090167 describes a light-scattering plastics which comprises 1 to 10% of particles which have a refractive index of less than 1.5 and a particle size of from 1 to 50 µm and 90 to 99% of an aromatic polycarbonate, the particles substantially being insoluble in the aromatic polycarbonate. Acrylate, polystyrene, glass, titanium dioxide or calcium carbonate particles are employed as scattering additives. LCD are mentioned as a use.

EP 0 269 324 B 1 describes a scattering additive composition and light-scattering thermoplastics polymer compositions comprising 0.1 to 10% of scattering additive.

In EP 0634 445 B1, Paraloid EXL 5137 is employed as a scattering additive in combination with inorganic particles in polycarbonate. 0.001 to 0.3% of these particles (e.g. titanium dioxide) contributing towards an improved resistance to ageing and therefore colour stability. This is particularly advantageous if compounds having high scattering agents contents (>2%) are exposed to elevated use temperatures (e.g. 140° C.) over a relatively long period of time (>500 hours).

WO 2004/090587 describes diffuser sheets having a thickness of 2 mm for use in LCD, which comprise 0.2 to 10% of scattering additive and have a gloss of 20 to 70% (measured in accordance with JIS K 7105) at least on one side. Coextruded sheets in which the coextruded layer is 20 to 200 µm thick are furthermore described. The base and coextruded layer comprise scattering additives. Crosslinked silicones, acrylates or talc are compounded in as scattering additives which have a particle diameter of from 5 to 30 µm.

The diffuser films known from the prior art have an unsatisfactory brightness, in particular in conjunction with the set of films conventionally used in a so-called backlight unit. To evaluate the suitability of the light-scattering sheets for so-called backlight units for LCD flat screens, the brightness of the total system must be considered.

In principle, a backlight unit (direct light system) has the structure described in the following. As a rule, it comprises a housing in which a varying number, depending on the size of the backlight unit, of fluorescent tubes, so-called CCFL (cold cathode fluorescent lamp), are arranged. The inside of the housing is equipped with a light-reflecting surface. The diffuser sheet, which has a thickness of from 1 to 3 mm, preferably a thickness of 2 mm, is positioned on this illumination system. On the diffuser sheet is a set of films which may have the following functions: light-scattering (diffuser films), circular polarizers, focusing of the light in the forwards direction by so-called BEF (brightness enhancing film) and linear polarizers. In this context, the linearly polarizing film is positioned directly under the LCD display on top.

Light-scattering plastics compositions in optical uses conventionally comprise inorganic or organic particles having a diameter of from 1 to 50 micrometers, and in some cases even up to 120 µm, i.e. they contain scattering centres which are responsible both for the diffusive and for the focusing properties.

In principle all acrylates, in particular core-shell acrylates, which are thermally stable up to at least 300° C., in order not to be destroyed at the processing temperatures of the transparent plastics, preferably polycarbonate, may be employed as transparent scattering pigments. Furthermore, the pigments should have no functionalities which lead to a degradation of the polymer chain of the polycarbonate. Thus e.g. Paraloid® from Röhm & Haas and Techpolymer® from Sekisui are particularly suitable for use for pigmenting transparent plastics. A large number of various types are available from these product lines. Core-shell acrylates from the Paraloid series are preferably employed.

The object of the present invention was to provide films which have improved properties compared with currently used films, in particular improved brightness with simultaneously high light-scattering, so that they are particularly suitable for use for backlight units.

SUMMARY OF THE INVENTION

A film comprising a matrix of transparent polymeric resin, and polymeric particles is disclosed. The particles are characterized in that their refractive index is different from that of the polymeric resin and in that their average particle size is 1 and 100 µm. One surface of the film is structured its 60° gloss value is greater than 0.5 and smaller than 20% , and its roughness is greater than 3 and lower than 25 µm. The other surface has a 60° gloss value greater than 50%. The film is suitable for use in flat screens.

DETAILED DESCRIPTION OF THE INVENTION

Surprisingly, it has been possible to achieve this object by the films according to the invention, which have a gloss (measured in accordance with EN ISO 2813 (angle of 60°)) of <20%, preferably <10% and of >0.5% and a roughness (measured in accordance with ISO 4288) of >3 µm, preferably >4 µm and <25 µm, preferably <20 µm on the structured side and a gloss (measured in accordance with EN ISO 2813 (angle of 60°)) of >50% on the glossy side. On the basis of the brightness properties and the simultaneously high light scattering, they are particularly suitable for backlight units. This effect manifests itself to an even greater degree in connection with a set of films which is typically used in a backlight unit (BLU) and is additionally laid on the film according to the invention.

The gloss of the film surface is particularly important and influences the optical properties of the film.

The present invention therefore provides transparent films of plastics which comprise at least one layer, at least one layer comprising transparent polymeric particles having a refractive index which differs from that of the matrix material, and which have a gloss (measured in accordance with EN ISO 2813 (angle of 60°)) of <20% and >0.5% and a roughness (measured in accordance with ISO 4288) of >3 µm and <25 µm on the structured side and a gloss (measured in accordance with EN ISO 2813 (angle of 60°)) of >50% on the glossy side.

The layer comprises 80 to 99.99 wt. % of a transparent plastics, preferably polycarbonate, and 0.01 to 20 wt. % of polymeric particles having an average particle size substantially of between 1 and 100 µm, preferably 1 to 50 µm. The film has a structured and a glossy side, the surface of the structured side having a gloss (measured in accordance with EN ISO 2813 (angle of 60°)) of <20% and >0.5% and a roughness (measured in accordance with ISO 4288) of >3 µm and <25 µm, preferably <20 µm, and the surface of the glossy side having a gloss (measured in accordance with EN ISO 2813 (angle of 60°)) of >50%.

Heated rubber rolls such as are disclosed in DE 32 28 002 (or the equivalent U.S. Pat. No. 4,368,240) are employed for production of the structured film surfaces.

The films according to the invention are preferably produced by thermoplastics processing.

The structuring of the film surfaces is carried out—as is known to the person skilled in the art—with the aid of rolls, preferably 3 rolls of a polishing stack. As is generally known, the structures of the two rolls which form the roll nip into which the melt (so-called melt curtain) enters after leaving the extruder die are particularly important for structuring the surface of the film. As is known to the person skilled in the art, rolls coated with silicone rubber, such as are disclosed e.g. in U.S. Pat. No. 4,368,240, are preferably employed for the production of matt or structured film surfaces. Essential process parameters for molding the structures are the temperature of the rubber rolls and the pressure in the roll nip which is exerted on the melt curtain between the rolls. The process parameters may quickly be determined by simple experiments.

In the polishing stack employed in the examples, the pressure in the roll nip is adjusted, for example, via the relative distance of the rolls from one another: a wide roll nip, e.g. 0.925, means that a low molding pressure is exerted on the melt in the roll nip, the structure is molded only very superficially on to the film surface, and a film with a high gloss is therefore produced.

An increase in the temperature of the silicone rubber rolls leads to an increase in the plastisizing of the melt in the roll nip, so that the melt may penetrate deeper into the surface structure of the rubber rolls and may be molded by this.

By the combination of elevated temperature, e.g. 130° C., and a narrow relative roll nip, e.g. 0.6, for example, films of polycarbonate which have a pronounced structure may be produced.

It is also generally known that smooth surfaces are preferably produced with polished metal rolls.

The present invention also provides the use of the films according to the invention as diffuser films for flat screens, in particular in the back-illumination of LCD displays.

The films according to the invention have a high light transmission with a simultaneously high light scattering and may be employed, for example, in the illumination systems of flat screens (LCD screens). A high light scattering with a simultaneous high light transmission and focusing of the light in the direction of the viewer is of decisive importance here. The illumination system of such flat screens may be achieved either with lateral light coupling (edgelight system) or, in the case of larger screen sizes where lateral light coupling is no longer adequate; via a backlight unit (BLU), in which the direct illumination behind the diffuser sheet must be distributed as uniformly as possible through this (direct light system).

The films according to the invention preferably have a thickness of from 30 µm to 1,000 µm. The films may be multi-layered composites of at least two films, which may be produced by extrusion.

For the production of films by extrusion, the granules of plastics, for example the polycarbonate granules, are fed to a feed hopper of an extruder and enter via this into the plastisizing system comprising screw and barrel. In the plastisizing system, the material of plastics is conveyed and melted. The melt of plastics is forced through a slot die. A filter device, a melt pump, stationary mixing elements and further components may be arranged between the plasticsizing system and the slot die. The melt which leaves the die arrives at a polishing calender. A rubber roll may be employed for one-sided structuring of the film surface. Final shaping takes place in the roll nip of the polishing calender. The rubber rolls used for the structuring of the film surface are described in U.S. Pat. No. 4,368,240. Fixing of the shape finally takes place by cooling, and in particular alternately on the polishing stack and in the ambient air. Further devices of the plastisizing system serve for transportation, any desired application of protective films, and winding up of the extruded films.

As is shown, surprisingly, in the examples according to the invention, very good brightnesses of the backlight unit are obtained if, in contradiction to WO 2004/090587, films which have a gloss of <20% and a roughness of >3 µm on the structured side and a gloss of >50% on the glossy side are employed.

Suitable plastics for the films according to the invention are all the transparent thermoplastics: polyacrylates, polymethyl methacrylates (PMMA; Plexiglas® from Röhm), cycloolefin copolymers (COC; Topas® from Ticona); Zenoex® from Nippon Zeon or Apel® from Japan Synthetic Rubber), polysulfones (Ultrason@ from BASF or Udel® from Solvay), polyesters, such as e.g. PET or PEN, polycarbonate and polycarbonate/polyester blends, e.g. PC/PET, polycarbonate/polycyclohexylmethanol cyclohexanedicarboxylate (PCCD; Xylecs® from GE) and polycarbonate/polybutylene terephthalate (PBT) blends.

Polycarbonates are preferably employed.

Suitable polycarbonates for the production of the films according to the invention are all the known polycarbonates. These are homopolycarbonates, copolycarbonates and thermoplastics polyester carbonates.

The suitable polycarbonates preferably have weight average molecular weights $\overline{M}_w$ of from 18,000 to 40,000, preferably from 26,000 to 36,000 and in particular from 28,000 to 35,000, determined by measurement of the relative solution viscosity in methylene chloride or in mixtures of equal amounts by weight of phenol/o-dichlorobenzene calibrated by light scattering.

The preparation of the polycarbonates is preferably carried out by the phase interface process or the melt transesterification process and is described in the following by the phase interface process by way of example.

The polycarbonates are prepared, inter alia, by the phase interface process. This process for polycarbonate synthesis is described in many instances in the literature; reference may be made by way of example to H. Schnell, Chemistry and Physics of Polycarbonates, Polymer Reviews, vol. 9, Interscience Publishers, New York 1964 p. 33 et seq., to Polymer Reviews, vol. 10, "Condensation Polymers by Interfacial and Solution Methods", Paul W. Morgan, Interscience Publishers, New York 1965, chap. VIII, p. 325, to Dres. U. Grigo, K. Kircher and P. R-Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, p. 118-145 and to EP-A 0 517 044.

Suitable aromatic dihydroxy compounds, especially diphenols, for producing polycarbonates are described e.g. in U.S. Pat. Nos. 2,999,835, 3,148,172, 2,991,273, 3,271,367, 4,982,014 and 2,999,846, in unexamined German applications 1 570 703, 2 063 050, 2 036 052, 2 211 956 and 3 832

396, French Patent Specification 1 561 518, in the monograph "H. Schnell, Chemistry and Physics of Polycarbonates, Interscience Publishers, New York 1964, p. 28 et seq.", and in "D. G. Legrand, J. T. Bendler, Handbook of Polycarbonate Science and Technology, Marcel Dekker New York 2000, p. 72 et seq".

Preparation of polycarbonates is also possible from diaryl carbonates and diphenols by the known polycarbonate process in the melt, the so-called melt transesterification process, which is described e.g. in WO-A 01/05866 and WO-A 01/05867. In addition, transesterification processes (acetate process and phenyl ester process) are described, for example, in U.S. Pat. Nos. 3,494,885, 4,386,186, 4,661,580, 4,680,371 and 4,680,372, in EP-A 26 120, 26 121, 26 684, 28 030, 39 845, 91 602, 97 970, 79 075, 14 68 87, 15 61 03, 23 49 13 and 24 03 01 and in DE-A 14 95 626 and 22 32 977.

Both homopolycarbonates and copolycarbonates are suitable. 1 to 25 wt. %, preferably 2.5 to 25 wt. % (based on the total amount of diphenols to be employed) of polydiorganosiloxanes having hydroxy-aryloxy end groups may also be employed for the preparation of copolycarbonates according to the invention as component A. These are known (see, for example, from U.S. Pat. No. 3,419,634) and may be prepared by processes known from the literature. The preparation of polydiorganosiloxane-containing copolycarbonates is described e.g. in DE-OS 33 34 782.

Polyester carbonates and block copolyester carbonates are furthermore suitable, in particular such as are described in WO 2000/26275. Aromatic dicarboxylic acid dihalides for the preparation of aromatic polyester carbonates are, preferably, the di-acid dichlorides of isophthalic acid, terephthalic acid, diphenyl ether-4,4'-dicarboxylic acid and naphthalene-2,6-dicarboxylic acid.

The aromatic polyester carbonates may be either linear or branched in a known manner (in this context see also DE-OS 29 40 024 and DE-OS 30 07 934).

The polydiorganosiloxane/polycarbonate block polymers may also be a mixture of polydiorganosiloxane/polycarbonate block copolymers with conventional polysiloxane-free, thermoplastics polycarbonates, the total content of polydiorganosiloxane structural units in this mixture being approx. 2.5 to 25 wt. %.

Such polydiorganosiloxane/polycarbonate block copolymers are known e.g. from U.S. Pat. No. 3,189,662, U.S. Pat. No. 3,821,325 and U.S. Pat. No. 3,832,419.

Preferred polydiorganosiloxane/polycarbonate block copolymers are prepared by reacting polydiorganosiloxanes containing alpha,omega-bishydroxyaryloxy end groups together with other diphenols, optionally co-using branching agents in the conventional amounts, e.g. by the two phase interface process (in this context see H. Schnell, Chemistry and Physics of Polycarbonates, Polymer Rev. vol. IX, page 27 et seq., Interscience Publishers New York 1964), the ratio of the bifunctional phenolic reactants in each case being chosen such that the content according to the invention of aromatic carbonate structural units and diorgano-siloxy units results therefrom.

Such polydiorganosiloxanes containing alpha,omega-bishydroxyaryloxy end groups are known e.g. from U.S. Pat. No. 3,419,634.

The particles to be employed according to the invention, preferably acrylate-based, preferably having core-shell morphology are, for example and preferably, those such as are disclosed in EP-A 634 445.

The polymeric particles have a core of a rubber-like vinyl polymer. The rubber-like vinyl polymer may be a homo- or copolymer of any desired one of the monomers which have at least one ethylenically unsaturated group and which undergo addition polymerization—such as is generally known—under the conditions of emulsion polymerization in an aqueous medium. Such monomers are listed in U.S. Pat. No. 4,226, 752, column 3, lines 40-62.

The polymeric particles most preferably comprise a core of rubber-like alkyl acrylate polymers, wherein the alkyl group has 2 to 8 carbon atoms, optionally copolymerized with 0 to 5% of crosslinking agent and 0 to 5% of grafting crosslinking agent, based on the total weight of the core. The rubber-like alkyl acrylate is preferably copolymerized with up to 50% of one or more copolymerizable vinyl monomers, for example those mentioned above. Suitable crosslinking and grafting crosslinking monomers are well-known to the person skilled in the art in the field, and they are preferably those such as are described in EP-A 0 269 324.

The polymeric particles comprise one or more jackets, i.e. shells. This one jacket or these several jackets are preferably prepared from a vinyl homo- or copolymer. Suitable monomers for the preparation of the jacket/jackets are listed in U.S. Pat. No. 4,226,752, column 4, lines 20-46, incorporated herein by reference. One jacket or several jackets are preferably a polymer of a methacrylate, acrylate, vinylarene, vinyl carboxylate, acrylic acid and/or methacrylic acid.

The polymeric particles are useful for conferring on the transparent plastics, preferably polycarbonate, light-scattering properties. The refractive index n of the core and of the jacket/jackets of the polymeric particles is preferably within +/−0.25 units, more preferably within +/−0.18 units, most preferably within +/−0.12 units of the refractive index of the polycarbonate. The refractive index n of the core and of the jacket/jackets is preferably not closer than +/−0.003 units, more preferably not closer than +/−0.01 units, most preferably not closer than +/−0.05 units to the refractive index of the polycarbonate. The refractive index is measured in accordance with the standard ASTM D 542-50 and/or DIN 53 400.

The polymeric particles in general have an average particle diameter (mean particle diameter or size) of at least 0.5 micrometers, preferably of at least 1 micrometer to not more than 100 micrometers, more preferably of from 2 to 50 micrometers, most preferably of from 2 to 15 micrometers. "Average particle diameter" (mean particle diameter) is to be understood as meaning the number-average. Preferably, at least 90%, most preferably at least 95% of the polymeric particles have a diameter of more than 1 micrometer and less than 100 μm. The polymeric particles are a free-flowing powder, preferably in compacted form.

The polymeric particles may be prepared in a known manner. In general, at least one monomer component of the core polymer is subjected to emulsion polymerization to form emulsion polymer particles. The emulsion polymer particles are swollen with the same or one or more other monomer components of the core polymer, and the monomer/monomers are polymerized within the emulsion polymer particles. The stages of swelling and polymerization may be repeated until the particles have grown to the desired core size. The core polymer particles are suspended in a second aqueous monomer emulsion, and a polymer jacket of the monomer/monomers is polymerized on to the polymer particles in the second emulsion. One jacket or several jackets may be polymerized on the core polymer. The preparation of core/jacket polymer particles is described in EP-A 0 269 324 and in the U.S. Pat. Nos. 3,793,402 and 3,808,180 incorporated herein by reference.

It is furthermore found, surprisingly, that the brightness values of the film may be increased further by using a small amount of optical brighteners in the plastics.

One embodiment of the invention is therefore a film according to the invention which may additionally comprise 0.001 to 0.2% by weight, preferably about 1,000 ppm of an optical brightener, preferably selected from the group consisting of bis-benzoxazoles, phenylcoumarins and bis-styryl-biphenyls.

A particularly preferred optical brightener is Uvitex OB from Ciba Spezialitätenchemie.

The films according to the invention are preferably produced by extrusion.

For the extrusion, polycarbonate granules are fed to the extruder and melted in the plastisizing system of the extruder. The melt of plastics is forced through a slot die and thereby shaped, brought into the desired final shape in the roll nip of a polishing calender and fixed in shape by alternate cooling on the polishing stack and in the ambient air. The polycarbonates of high melt viscosity used for the extrusion are conventionally processed at melt temperatures of from 260 to 320° C., and the barrel temperatures of the plastisizing barrel and the die temperatures are set accordingly.

By employing one or more subsidiary extruders and suitable melt adapters before the slot die, polycarbonate melts of different composition may be laid on one another and multi-layered films may thus be produced (see, for example, EP-A 0 110 10 221 and EP-A 0 110 238).

Both the base layer and the coextruded layer(s), which are optionally present, of the films according to the invention may additionally comprise additives, such as, for example, UV absorbers and other conventional processing auxiliaries, in particular mold release agents and flow agents, as well as the stabilizers, in particular heat stabilizers, as well as antistatics and optical brighteners which are conventional for polycarbonates. In this context, different additives or concentrations of additives may be present in each layer. Preferably, the coextruded layer(s) comprise the antistatics, UV absorbers and mold release agents.

In a preferred embodiment, the composition of the film additionally comprises 0.01 to 0.5% by weight of a UV absorber from the classes of benzotriazole derivatives, dimeric benzotriazole derivatives, triazine derivatives, dimeric triazine derivatives and diaryl cyanoacrylates.

Suitable stabilizers are, for example, phosphines, phosphites or Si-containing stabilizers and further compounds described in EP-A 0 500 496. There may be mentioned by way of example triphenyl phosphites, diphenyl alkyl phosphites, phenyl dialkyl phosphites, tris-(nonylphenyl)phosphite, tetrakis-(2,4-di-tert-butylphenyl)4,4'-biphenylene-diphosphonite, bis-(2,4-dicumylphenyl)-pentaerythritol diphosphite and triaryl phosphite. Triphenylphosphine and tris-(2,4-di-tert-butylphenyl)phosphite are particularly preferred.

Suitable mold release agents are, for example, the esters or partial esters of mono- to hexahydric alcohols, in particular of glycerol, of pentaerythritol or of Guerbet alcohols.

Monohydric alcohols are, for example, stearyl alcohol, palmityl alcohol and Guerbet alcohols, a dihydric alcohol is, for example, glycol, a trihydric alcohol is, for example, glycerol, tetrahydric alcohols are, for example, pentaerythritol and mesoerythritol, pentahydric alcohols are, for example, arabitol, ribitol and xylitol, and hexahydric alcohols are, for example, mannitol, glucitol (sorbitol) and dulcitol.

The esters are preferably the monoesters, diesters, triesters, tetraesters, pentaesters and hexaesters or mixtures thereof, in particular statistical mixtures, of saturated aliphatic $C_{10}$ to $C_{36}$-monocarboxylic acids and optionally hydroxy-monocarboxylic acids, preferably with saturated aliphatic $C_{14}$ to $C_{32}$-monocarboxylic acids and optionally hydroxy-monocarboxylic acids.

The commercially obtainable fatty acid esters, in particular of erythritol and of glycerol, may contain <60% of different partial esters due to their preparation.

Saturated aliphatic monocarboxylic acids having 10 to 36 C atoms are, for example, capric acid, lauric acid, myristic acid, palmitic acid, stearic acid, hydroxystearic acid, arachic acid, behenic acid, lignoceric acid, cerotic acid and montan acids.

Examples of suitable antistatics are cationic compounds, for example quaternary ammonium, phosphonium or sulfonium salts, anionic compounds, for example alkylsulfonates, alkyl sulfates, alkyl phosphates and carboxylates in the form of alkali metal or alkaline earth metal salts, and nonionic compounds, for example polyethylene glycol esters, polyethylene glycol ethers, fatty acid esters and ethoxylated fatty amines. Preferred antistatics are nonionic compounds.

The invention is to be explained in more detail by the following examples.

EXAMPLES

Preparation of a Masterbatch by Compounding

The masterbatch was prepared with conventional twin-screw compounding extruders (e.g. ZSK 32) at conventional processing temperatures for polycarbonate of from 250 to 330° C.

A masterbatch having the following composition was prepared:
- 80 wt. % of Makrolon® 3108 550115 (polycarbonate (PC) from Bayer MaterialScience AG)
- 20 wt. % of core-shell particles having a butadiene/styrene core and a methyl methacrylate shell (Paraloid® EXL 5137 from Röhm & Haas) having a particle size of from 2 to 15 μm and an average particle size of 8 μm.

The installation used for the production of the films comprises
- a main extruder with a screw of 105 mm diameter (D) and a length of 41×D; the screw has a devolatilization zone;
- a coextruder for application of a top layer with a screw of length 25×D and a diameter (D) of 35 mm;
- a deflection head;
- a coextrusion slot die of 1,500 mm width;
- a triple-roll polishing calender with horizontal roll arrangement, the third roll be swivellable by +/−45° with respect to the horizontal;
- a roller conveyor;
- a device for application of protective film on both sides;
- a take-off device
- a winding-up station The particular granules of the light-scattering material were fed to the feed hopper of the main extruder. The polycarbonate was fed to the feed hopper of the coextruder. The melting and conveying of the particular material took place in the particular barrel/screw plastisizing system. The two material melts were brought together in the deflection head before the coextrusion die and then fed to the polishing calender, the rolls of which had the temperatures stated in Table 1. Final shaping and cooling of the film took place on the polishing calender (comprising three rolls). For structuring of the film surface on one side, a rubber roll was employed here. The rubber roll used for structuring the film surface is disclosed in U.S. Pat. No. 4,368,240. The film was then transported by a take-off unit.

TABLE 1

| Process parameter | |
|---|---|
| Temperature of the main extruder | about 275° C. |
| Temperature of the coextruder | about 260° C. |
| Temperature of the deflection head | about 285° C. |
| Temperature of the die | about 300° C. |
| Speed of rotation of the main extruder | 45 min$^{-1}$ |
| Speed of rotation of the coextruder | 12 min$^{-1}$ |
| Temperature of rubber roll 1 | 24° C. |
| Temperature of roll 2 | 72° C. |
| Temperature of roll 3 | 131° C. |
| Take-off speed | 21.5 m/min |

Example 1

The following light-scattering composition was fed to the main extruder:
96.0 wt. % of Makrolon® 3108 550115 polycarbonate
4.0 wt. % of masterbatch (as described above)
The coextruder was fed with
Makrolon® 3108 550115 polycarbonate
A coextruded film with a transparent polycarbonate layer having a smooth surface and a light-scattering layer having a structured surface and a total thickness of 125 μm was obtained from these. The light-scattering layer has a thickness of 100 μm and the PC layer a thickness of 25 μm.
Rubber roll 1: approx. 30° C.
Relative nip dimension between rolls 1 and 2: 0.6

Example 2

The following light-scattering composition was fed to the main extruder:
96 wt. % of Makrolon® 3108 550115 polycarbonate
4 wt. % of masterbatch (as described above)
The coextruder was fed with
Makrolon® 3108 550115 polycarbonate
A coextruded film with a transparent polycarbonate layer having a smooth surface and a light-scattering layer having a structured surface and a thickness of 150 μm was obtained from these. The light-scattering layer was 100 μm and the PC layer 50 μm thick.
Rubber roll 1: approx. 30° C.
Relative nip dimension between rolls 1 and 2: 0.6

Example 3

The following light-scattering composition was fed to the main extruder:
94 wt. % of Makrolon® 3108 550115 polycarbonate
6 wt. % of masterbatch (as described above)
Makrolon® 3108 550115 polycarbonate was fed to the coextruder.
A coextruded film with a transparent polycarbonate layer having a smooth surface and a light-scattering layer having a structured surface and a total thickness of 125 μm was extruded from these. The light-scattering layer was 100 μm thick and the PC layer 25 μm thick.
Rubber roll 1: approx. 30° C.
Relative nip dimension between rolls 1 and 2: 0.6

Example 4

The following light-scattering composition was fed to the main extruder:
94 wt. % of Makrolon® 3108 550115 polycarbonate 6 wt. % of masterbatch (as described above)
Makrolon® 3108 550115 polycarbonate was fed to the coextruder.
A coextruded film with a transparent polycarbonate layer having a smooth surface and a light-scattering layer having a structured surface and a total thickness of 150 μm was extruded from these. The light-scattering layer had a thickness of 100 μm and the PC layer a thickness of 50 μm.
Rubber roll 1: approx. 30° C.
Relative nip dimension between rolls 1 and 2: 0.6

Example 5

The following light-scattering composition was fed to the main extruder:
94 wt. % of Makrolon® 3108 550115 polycarbonate
6 wt. % of masterbatch (as described above)
Makrolon® 3108 550115 polycarbonate was fed to the coextruder:
A coextruded film with a transparent polycarbonate layer having a smooth surface and a light-scattering layer having a structured surface and a total thickness of 125 μm was extruded from these. The light-scattering layer had a thickness of 100 μm.
Rubber roll 1: approx. 30° C.
Relative nip dimension between rolls 1 and 2: 0.6

Example 6

The following light-scattering composition was fed to the main extruder:
94 wt. % of Makrolon® 3108 550115 polycarbonate
6 wt. % of masterbatch (as described above)
Makrolon® 3108 550115 polycarbonate was fed to the coextruder.
A coextruded film with a transparent polycarbonate layer having a smooth surface and a light-scattering layer having a structured surface and a total thickness of 125 μm was extruded from these. The light-scattering layer had a thickness of 100 μm.
Rubber roll 1: approx. 30° C.
Relative nip dimension between rolls 1 and 2: 0.6

Comparison Example 7

Not According to the Invention

The following light-scattering composition was fed to the main extruder:
94 wt. % of Makrolon® 3108 550115 polycarbonate
b 6 wt. % of masterbatch (as described above)
Makrolon® 3108 550115 polycarbonate was fed to the coextruder.
A coextruded film with a transparent polycarbonate layer having a smooth surface and a light-scattering layer having a structured surface and a total thickness of 125 μm was extruded from these. The light-scattering layer had a thickness of 100 μm.
Rubber roll 1: approx. 30° C.
Relative nip dimension between rolls 1 and 2: 0.925

Comparison Example 8

Not According to the Invention

The following light-scattering composition was fed to the main extruder:

94 wt. % of Makrolon® 3108 550115 polycarbonate
6 wt. % of masterbatch (as described above)
Makrolon® 3108 550115 polycarbonate was fed to the coextruder.

A coextruded film with a transparent polycarbonate layer having a smooth surface and a light-scattering layer having a structured surface and a total thickness of 125 µm was extruded from these. The thickness of the light-scattering layer was 100 µm.

Rubber roll 1: approx. 6.5° C.
Relative nip dimension between rolls 1 and 2: 0.9

Comparison Example 9

Not According to the Invention

The following light-scattering composition was fed to the main extruder:
94 wt. % of Makrolon® 3108 550115 polycarbonate 6 wt. % of masterbatch (as described above)
Makrolon® 3108 550115 polycarbonate was fed to the coextruder.

A coextruded film with a transparent polycarbonate layer having a smooth surface and a light-scattering layer having a structured surface and a total thickness of 125 µm was extruded from these. The thickness of the light-scattering layer was 100 µm.

Rubber roll 1: approx. 6.5° C.
Relative nip dimension between rolls 1 and 2: 0.95

Procedure for the Optical Measurements

The films produced in Examples 1 to 9 were investigated for their optical properties:

The gloss was determined in accordance with the standard EN ISO 2813 (angle of 60°)

The roughness was determined in accordance with the standard ISO 4288.

For determination of the light transmission (Ty (C2°)), an Ultra Scan XE from Hunter Associates Laboratory, Inc. was used. A Lambda 900 from Perkin Elmer Optoelectronics was used for the light reflection (Ry (C2°)). A Hazegard Plus from Byk-Gardner was used for the haze determination (in accordance with ASTM D 1003). The half-width angle HW was determined with goniophotometer in accordance with DIN 58161 as a measure of the intensity of the light-scattering action. The luminous density measurements (brightness measurements) were carried out on a backlight unit (BLU) from DS LCD, (LTA320W2-L02, 32" LCD TV panel) with the aid of an LS 100 luminance meter from Minolta.

The procedure was as follows for measurement of the brightness: specimens were cut out of the films of Examples 1 to 9 to fit into a backlight unit (BLU) from DS LCD (LTA320W2-L02, 32" LCD TV panel) and installed therein. For this, the film which lies directly on the diffuser sheet of the backlight unit was replaced by the exemplified films. These films were arranged such that the smooth side was laid on the diffuser sheet. The other two films (Dual Brightness Enhancement Film [DBEF] and Brightness Enhancement Film [BEF] which were on the replaced film in the backlight unit were laid back on the films from the examples in the original sequence and arrangement after the replacement. Accordingly, the sequence of films in the BTU was as follows:
BEF
DBEF
Exemplified film
Diffuser Sheet The brightness of the backlight unit modified in this way was measured.

The brightness of the original backlight unit was additionally measured (Example 10).

For this, the brightness was measured in each case at a total of 9 different places on the backlight unit (with the aid of a Minolta LS100 luminance meter) and the mean was calculated therefrom.

It may be seen from the examples that the brightness of the unit with the films according to the invention is considerably greater than the brightness of the unit with the comparison films and the original unit.

TABLE 2

Measurement results

| | Example 1 | Example 2 | Example 3 | Example 4 | Example 5 | Example 6 | Example 7 | Example 8 | Example 9 | Example 10 (original backlight unit) |
|---|---|---|---|---|---|---|---|---|---|---|
| Gloss (smooth side) | 104 | 104 | 104 | 103.9 | 103 | 103.9 | 103.5 | 103.8 | 103.9 | — |
| Gloss (structured side) | 2.3 | 2.1 | 2.2 | 2.2 | 5.5 | 1.4 | 43.8 | 28.8 | 77 | — |
| Roughness R3Z [µm] | 6.2 | 6.0 | 6.0 | 6.4 | 6.67 | 9.14 | 1.95 | 3.92 | 1.44 | — |
| Transmission [%] {(C. 2°) Hunter Ultra Scan} | 85.21 | 84.45 | 85.21 | 84.85 | 85.31 | 85.54 | 85.1 | 85.48 | 84.78 | 67.4 |
| Reflection [%] {(C. 2°) Hunter Scan} | 10.44 | 10.38 | 10.68 | 10.60 | 10.55 | 10.5 | 10.35 | 10.41 | 0.54 | 8.89 |
| Haze [%] | 95.1 | 95.6 | 95.6 | 95.8 | 93.2 | 92.0 | 95.3 | 95.0 | 95.1 | — |
| Half-width angle [°] | 8.4 | 9.2 | 9.2 | 8.5 | 8.2 | 6.5 | 7.2 | 9.2 | 8.4 | 4.0 |
| Brightness [cd/m$^2$] | 7414 | 7404 | 7414 | 7402 | 7448 | 7507 | 7259 | 7307 | 7253 | 7380 |

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A film comprising 80 to 99.99% relative to the weight of the film of a transparent polymeric resin matrix, and 0.01 to 20% relative to the weight of the film of polymeric particles dispersed in said matrix, said particles having a refractive index different from that of the polymeric resin and average particle size of 1 and 100 μm, one surface of said film having structured surface having 60° gloss value greater than 0.5 and smaller than 20%, and roughness $R_{3z}$ greater than 3 and lower than 25 μm, the other surface having a 60° gloss value greater than 50%, said gloss measured in accordance with EN ISO 2813, said roughness determined in accordance with ISO 4288.

2. The film according to claim 1, wherein the transparent polymeric resin is polycarbonate.

3. The film according to claim 1, wherein the thickness of the film is 0.03 to 1 mm.

4. The films according to claim 1 prepared by extrusion.

5. The film according to claim 1 wherein the polymeric particles comprise acrylate and have core-shell morphology.

6. A backlight-unit comprising the film of claim 1.

7. A flat screen comprising the film of claim 1.

8. A flat screen comprising the backlight-unit of claim 6.

* * * * *